US009731826B2

(12) United States Patent
Savian et al.

(10) Patent No.: US 9,731,826 B2
(45) Date of Patent: Aug. 15, 2017

(54) STORAGE BIN WITH LUGGAGE POSITIONING PROTRUSIONS

(71) Applicant: C&D ZODIAC, INC., Huntington Beach, CA (US)

(72) Inventors: Scott Savian, Huntington Beach, CA (US); Eric Long, Huntington Beach, CA (US); Eric Heimbach, Huntington Beach, CA (US)

(73) Assignee: C&D Zodiac, Inc., Huntington Beach, CA (US)

( * ) Notice: Subject to any disclaimer, the term of this patent is extended or adjusted under 35 U.S.C. 154(b) by 0 days.

(21) Appl. No.: 15/356,149

(22) Filed: Nov. 18, 2016

(65) Prior Publication Data

US 2017/0158332 A1 Jun. 8, 2017

Related U.S. Application Data

(60) Provisional application No. 62/264,205, filed on Dec. 7, 2015.

(51) Int. Cl.
    *B64D 11/00* (2006.01)
(52) U.S. Cl.
    CPC .................. *B64D 11/003* (2013.01)
(58) Field of Classification Search
    CPC . B64D 11/003; B60R 7/04; B60R 2011/0028; B60R 11/00; B60R 5/006; B60R 7/02; B60R 5/045

(Continued)

(56) References Cited

U.S. PATENT DOCUMENTS

| 4,637,642 A | 1/1987 | Stoecker |
| 4,917,747 A | 4/1990 | Chin et al. |

(Continued)

FOREIGN PATENT DOCUMENTS

| CA | 2377749 | 9/2003 |
| EP | 0718189 | 6/1996 |

(Continued)

OTHER PUBLICATIONS

Int'l Search Report and Written Opinion dated Jan. 27, 2017 in PCT/US2016/062890.

(Continued)

*Primary Examiner* — Tien Dinh
*Assistant Examiner* — Alexander V Giczy
(74) *Attorney, Agent, or Firm* — Jeffer Mangels Butler & Mitchell LLP; Brennan C. Swain, Esq.

(57) ABSTRACT

An aircraft storage bin that includes an upper housing and a bucket movable with respect to the upper housing between a closed position and an open position. The upper housing and the bucket cooperate to define a bin interior. The bucket includes a bottom and first and second opposing side walls. The bottom of the bucket includes an outer surface, an inner surface, a front edge, and first and second protrusions protruding into the bin interior. The first protrusion defines a first luggage engaging surface and the second protrusion defines a second luggage engaging surface. The first protrusion includes an inner surface and an outer surface that defines a channel. The channel includes at least a portion of a latch button assembly disposed therein. The first and second cables extend outwardly from the latch button assembly and through the channel. The bucket includes a cover further partially defining the channel.

12 Claims, 7 Drawing Sheets

(58) Field of Classification Search
USPC .............. 280/783; 220/4.23, 4.22, 4.21, 608
See application file for complete search history.

(56) References Cited

U.S. PATENT DOCUMENTS

| | | | |
|---|---|---|---|
| 5,108,048 A | 4/1992 | Chang | |
| 5,129,597 A | 7/1992 | Manthey | |
| 5,383,628 A | 1/1995 | Harriehausen | |
| 5,456,529 A | 10/1995 | Cheung | |
| 5,567,028 A | 10/1996 | Lutovsky et al. | |
| 5,651,733 A | 7/1997 | Schumacher | |
| 5,823,472 A | 10/1998 | Luria | |
| 5,842,668 A | 12/1998 | Spencer | |
| 5,934,615 A | 8/1999 | Treichler et al. | |
| 6,045,204 A | 4/2000 | Frazier et al. | |
| 6,315,436 B1 | 11/2001 | Schenk et al. | |
| 6,338,517 B1 | 1/2002 | Canni | |
| 6,398,163 B1 | 6/2002 | Welch | |
| 6,494,404 B1 | 12/2002 | Meyer | |
| 6,550,878 B2 | 4/2003 | Nott et al. | |
| 6,574,835 B2 | 6/2003 | Melhuish | |
| 6,886,781 B2 | 5/2005 | Lau | |
| 7,090,314 B2 | 8/2006 | Burrows et al. | |
| 7,258,406 B2 | 8/2007 | Stephan et al. | |
| 7,302,150 B2 | 11/2007 | Druckman et al. | |
| 7,601,004 B2 | 10/2009 | Lamoree et al. | |
| 7,823,830 B2 | 11/2010 | Feldkirchner et al. | |
| 8,011,618 B2 | 9/2011 | Bock | |
| 8,136,897 B2 | 3/2012 | Mascari | |
| 8,146,227 B2 | 4/2012 | Schmitz et al. | |
| 8,262,022 B2 | 9/2012 | Young et al. | |
| 8,556,118 B2 | 10/2013 | Hamaguchi | |
| 8,651,548 B2 | 2/2014 | Shirase | |
| 9,090,351 B1* | 7/2015 | Frazier | B64D 11/003 |
| 2004/0245897 A1 | 12/2004 | Stephan et al. | |
| 2005/0064174 A1* | 3/2005 | Gideon | B29C 33/0072 |
| | | | 428/317.9 |
| 2006/0157620 A1* | 7/2006 | Granzeier | B60R 7/04 |
| | | | 244/129.1 |
| 2006/0214055 A1 | 9/2006 | Novak et al. | |
| 2007/0095981 A1 | 5/2007 | Bock | |
| 2008/0078871 A1 | 4/2008 | Munson | |
| 2008/0112754 A1 | 5/2008 | Schmitz | |
| 2010/0206985 A1 | 8/2010 | Rahlff | |
| 2011/0139929 A1* | 6/2011 | Young | B64D 11/003 |
| | | | 244/118.5 |
| 2011/0140462 A1* | 6/2011 | Lin | B64D 11/003 |
| | | | 292/143 |
| 2011/0253837 A1 | 10/2011 | Lee et al. | |
| 2012/0012702 A1 | 1/2012 | Moritz | |
| 2012/0012707 A1 | 1/2012 | Schliwa | |
| 2012/0038254 A1 | 2/2012 | Rafler | |
| 2012/0074258 A1 | 3/2012 | Papke | |
| 2012/0228426 A1 | 9/2012 | Schneider et al. | |
| 2012/0273615 A1 | 11/2012 | Rafler | |
| 2013/0206903 A1 | 8/2013 | Savian et al. | |
| 2013/0233971 A1* | 9/2013 | Burrows | B64D 11/003 |
| | | | 244/118.5 |
| 2013/0269253 A1* | 10/2013 | Graf | E05F 15/00 |
| | | | 49/13 |
| 2015/0102167 A1* | 4/2015 | Smith | B64D 11/003 |
| | | | 244/118.5 |
| 2015/0329207 A1* | 11/2015 | Funk | B64D 11/003 |
| | | | 244/118.1 |
| 2016/0229537 A1* | 8/2016 | Scown | B64F 5/00 |
| 2016/0297523 A1* | 10/2016 | Walton | B64F 5/10 |
| 2017/0066533 A1* | 3/2017 | Long | B64D 11/0015 |

FOREIGN PATENT DOCUMENTS

| | | |
|---|---|---|
| EP | 1299020 | 12/2005 |
| GB | 2437620 | 10/2007 |

OTHER PUBLICATIONS

PCT/US2014/016313 International Search Report & Written Opinion dated May 30, 2014.
EP13749848.1 Extended Search Report dated Oct. 14, 2015.

* cited by examiner

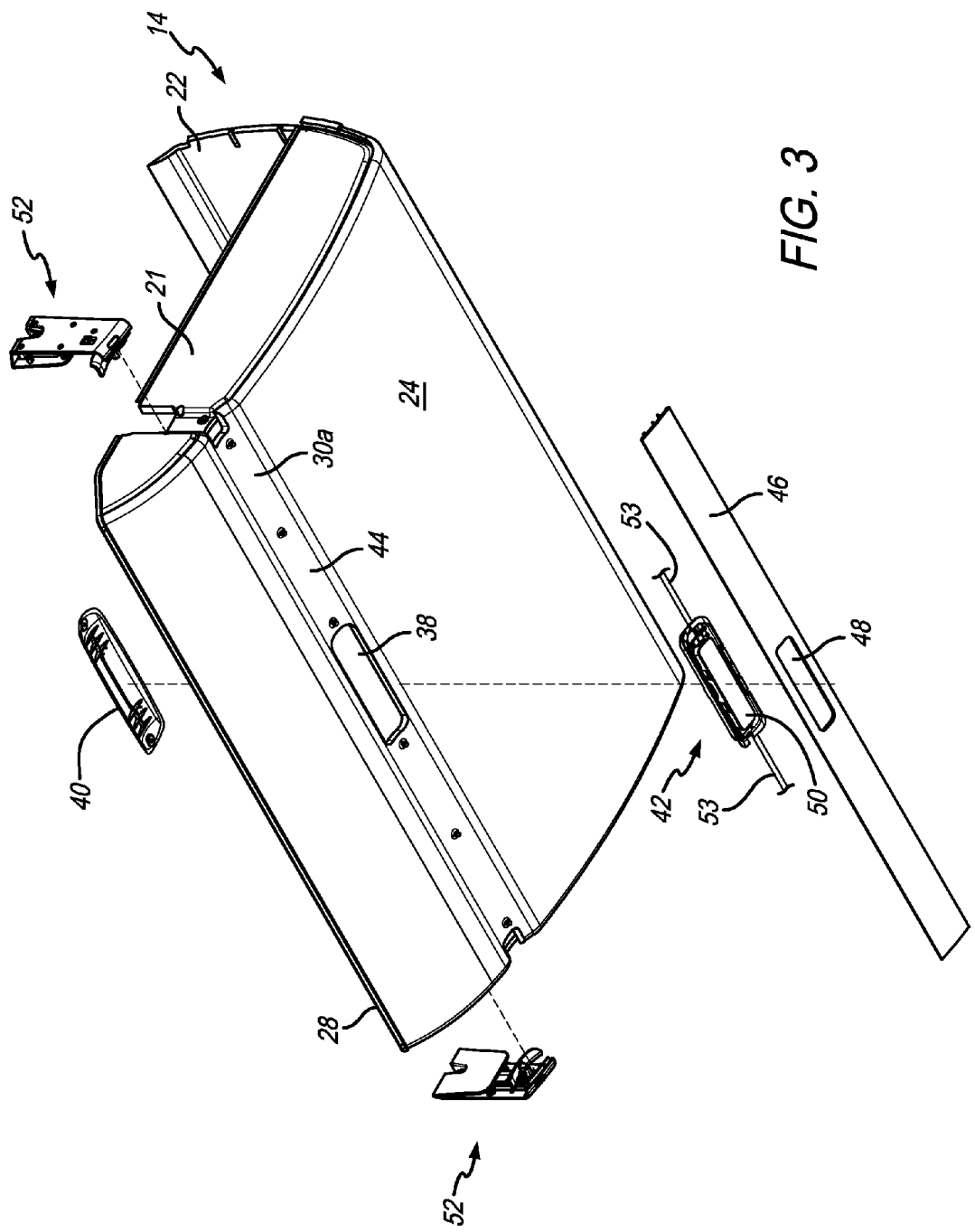

STORAGE BIN WITH LUGGAGE POSITIONING PROTRUSIONS

CROSS REFERENCE TO RELATED APPLICATIONS

This application claims the benefit of U.S. Provisional Application No. 62/264,205, filed Dec. 7, 2015, which is incorporated by reference herein in its entirety.

FIELD OF THE INVENTION

The present invention relates generally to overhead storage bin assemblies, and more particularly to an assembly in an overhead storage bin assembly that helps position luggage within the bin.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include overhead luggage storage bins mounted from the ceiling, walls or other structural portion of the aircraft over the passenger seats. These bins are designed to accommodate the size, shape, and weight of passenger carry-on luggage. Positioning of the luggage within the bin is important in order to maximize the volume within the bin that is used and to reduce hand loads required for closing the bin.

Other overhead storage bin assemblies are well known in the art. For example, see U.S. Patent Publication No. 2011/0253837 published Oct. 20, 2011, U.S. Pat. No. 4,637,642 issued on Jan. 20, 1987, U.S. Pat. No. 5,567,028 issued on Oct. 22, 1996, and U.S. Pat. No. 8,262,022 issued on Sep. 11, 2012 the entireties of which are hereby incorporated by reference.

BRIEF DESCRIPTION OF THE DRAWINGS

FIG. 3 is an exploded perspective view of the exterior of the bucket of the aircraft storage bin of FIG. 1;

Like numerals refer to like parts throughout the several views of the drawings.

SUMMARY OF THE PREFERRED EMBODIMENTS

Figure 1:
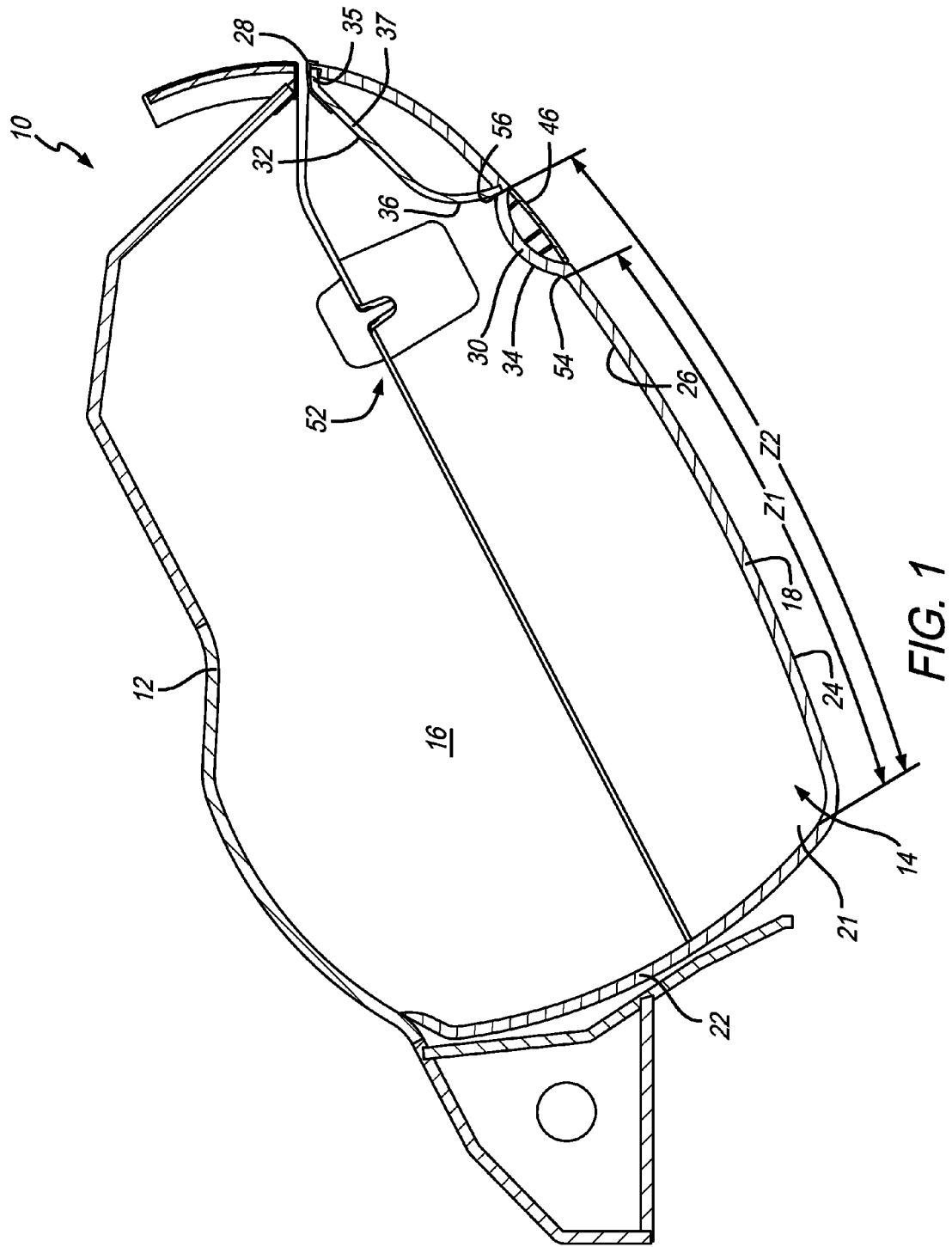
FIG. 1 is a cross-sectional side elevation of an aircraft storage bin in accordance with a preferred embodiment of the present invention.

In accordance with a first aspect of the present invention there is provided an aircraft storage bin that includes an upper housing, and a bucket movable with respect to the upper housing between a closed position and an open position. The upper housing and the bucket cooperate to define a bin interior. The bucket includes a bottom and first and second opposing side walls. The bottom of the bucket includes an outer surface, an inner surface, a front edge, and first and second protrusions protruding into the bin interior. The first protrusion defines a first luggage engaging surface and the second protrusion defines a second luggage engaging surface. In a preferred embodiment, the first and second protrusions extend between the first and second side walls and at least one of the first and second protrusions is formed in the bottom. In another embodiment, the first protrusion is formed in the bottom and wherein the second protrusion is secured to the bottom.

Preferably, the outer surface of the first protrusion defines a channel that includes at least a portion of a latch button assembly disposed therein. In a preferred embodiment, first and second cables extend outwardly from the latch button assembly and through the channel and the channel includes a cover. Preferably, the channel includes a button opening defined therethrough and the first protrusion includes a latch opening defined therethrough.

In a preferred embodiment, a first luggage zone is defined between the first luggage engaging surface and the back and a second luggage zone is defined between the second luggage engaging surface and the back. Preferably, the second protrusion includes a platform portion.

In accordance with another aspect of the present invention there is provided an aircraft storage bin that includes an upper housing, and a bucket movable with respect to the upper housing between a closed position and an open position. The upper housing and the bucket cooperate to define a bin interior. The bucket includes a bottom and first and second opposing side walls. The bottom includes an outer surface, an inner surface, a front edge, and first and second protrusions extending between the first and second side walls and protruding into the bin interior. The first protrusion defines a first luggage engaging surface and the second protrusion defines a second luggage engaging surface. A first luggage zone is defined between the first luggage engaging surface and the back and a second luggage zone is defined between the second luggage engaging surface and the back. At least the first protrusion is formed in the bottom and an outer surface of the first protrusion defines a channel that includes at least a portion of a latch button assembly disposed therein. First and second cables extend outwardly from the latch button assembly and through the channel. The channel includes a cover that has a button opening defined therethrough and the first protrusion includes a latch opening defined therethrough.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-16 show a pivot bin assembly 10. In particular, the invention can be used on commercial passenger aircraft. However, this is not a limitation on the present invention and the pivot bin assembly can be used elsewhere.

The present invention is directed to an aircraft storage bin 10 that includes an upper housing 12 and a bucket 14 that is movable with respect to the upper housing 12. The bucket 14 may pivot, translate or otherwise move in any way with respect to the upper housing 12 between a closed position and an upper position so that luggage 100 or other items can be positioned in the bin interior 16 that is defined by the bucket 14 and the upper housing 12. The present invention aircraft storage bin 10 employs a "clamshell design," such as the one disclosed in U.S. Pat. No. 8,955,805, the entirety of which is incorporated by reference herein in its entirety. In the "clam shell" configuration the side walls of the bucket 14 abut the side walls of the upper housing. However, it will be appreciated by those of ordinary skill in the art that the bucket can have the shape of any bucket used in aircraft storage bins. For example, the bucket can have a C-shaped cross section with a top and sides that do not abut the upper housing, similar to that taught in U.S. Patent Publication No. 2011/0139929, the entirety of which is incorporated by reference herein. Furthermore, in a preferred embodiment, the storage bin 10 is used in a passenger aircraft. However, this is not a limitation on the present invention and the bin can be used for storage in other places and situations.

As shown in FIGS. 1-5B, the bucket 14 generally includes a bottom 18, first and second opposing sides 20 and 21 secured to and extending upwardly from the bottom 18, and a back 22. The bottom 18, first and second sides 20 and 21 and back 22 can be a single unitary piece or can be separate pieces secured or affixed together. The bottom 18 includes an outer surface 24, an inner surface 26, a front edge 28, and first and second protrusions 30 and 32 protruding into the bin interior 16. As shown in FIG. 1, the first protrusion 30 defines a first luggage engaging surface 34 and the second protrusion 32 defines a second luggage engaging surface 36. In a preferred embodiment, the first and second protrusions 30 and 32 extend or span the entire distance of the interior of the bucket from the first side wall 20 to the second side wall 21 (see FIG. 2). In another embodiment, the first and second protrusions 30 and 32 can extend part of the distance between the sides or can by broken up by indentations or openings. As shown in FIG. 1, in a preferred embodiment, the second protrusion 32 includes a front edge portion 35 that is generally flush with the front edge 28 of the bucket 14 and a platform portion 37 extending between the front edge portion 25 and the first luggage engaging surface 34. Luggage that is different sized or does not readily fit into the luggage zones described below can rest on the platform portion 37. In a preferred embodiment, the second protrusion 32 is thick enough that it provides lateral support and strength to the bucket 14 and prevents the side walls and bottom from flexing side to side (aft to forward). This also helps prevent the bucket from flexing during flight and causing the latch to unhook.

Figure 2:
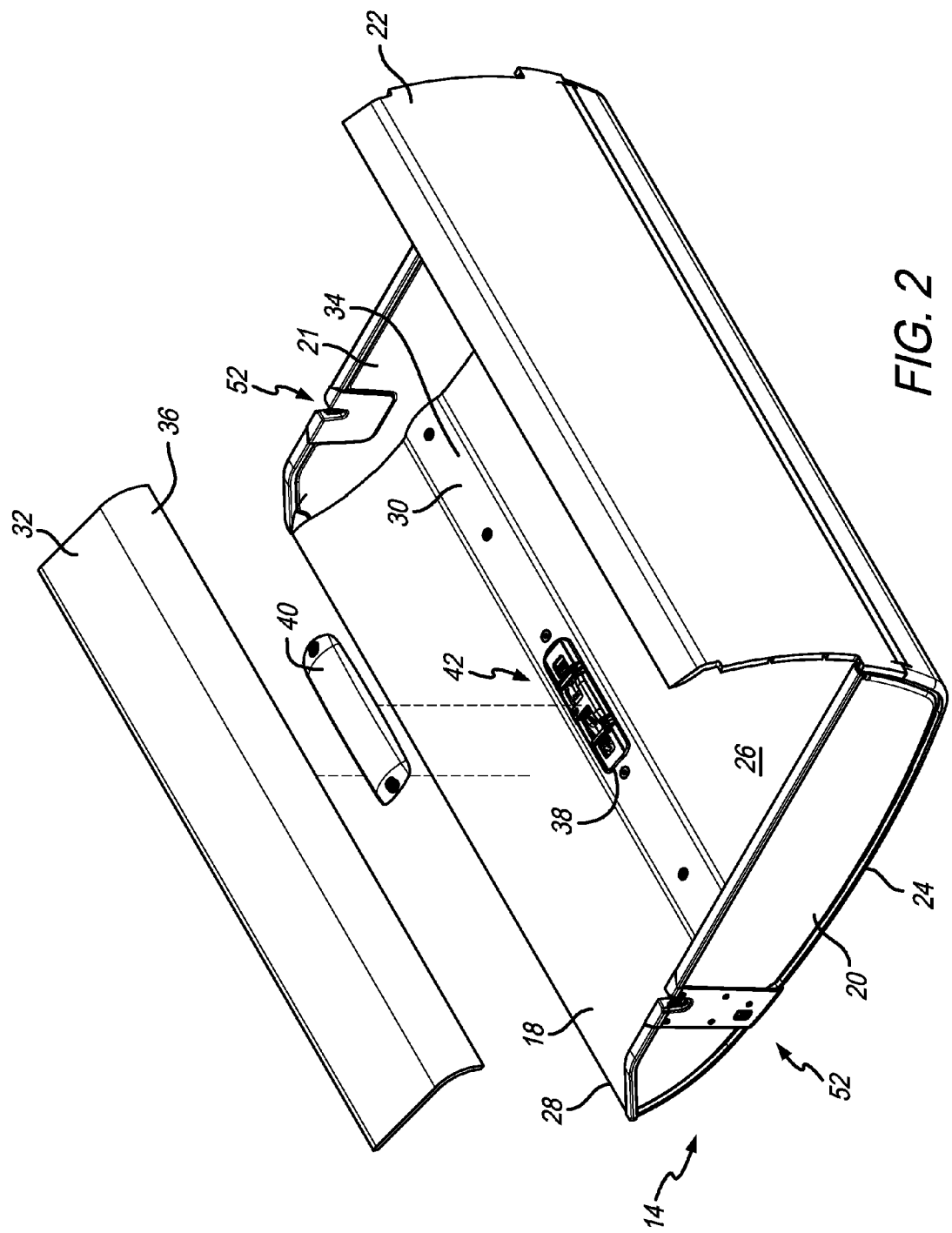
FIG. 2 is an exploded perspective view of the interior of the bucket of the aircraft storage bin of FIG. 1.

As shown in FIG. 2, in a preferred embodiment, the first protrusion 30 is formed in or is a part of the bottom 18 of the bucket 14 and the second protrusion 32 is a separate piece or component that is secured to or otherwise attached to the inner surface 26 of the bottom 18. In another embodiment, both of the first and second protrusions 30 and 32 can be formed in the bottom 18. In another embodiment, both of the first and second protrusions 30 and 32 can be secured to the bottom 18. In a preferred embodiment, the first protrusion 30 includes a latch opening 38 defined therethrough that is covered by a latch cover 40. The latch cover and opening 38 provide access to a latch button assembly 42.

As shown in FIG. 3, in a preferred embodiment, the outer surface 30a of the first protrusion defines a channel 44 that at least partially receives or houses the latch button assembly 42. The bucket 14 also includes a cover strip 46 that covers the latch button assembly 42 on the outside thereof, and includes a button opening 48 through which the button 50 of the latch button assembly 42 extends or is accessible. The cover strip 46 partially defines the channel 44 together with the outer surface 30a of the first protrusion 30. In a preferred embodiment, cables 53 extend from the latch button assembly 42 through the channel 44 and to the latch assemblies 52 located in or on the sidewalls 20 and 21. It will be appreciated that the type of latch button assembly and button is not a limitation on the present invention. The button can be pushed inwardly or pulled outwardly to activate the latches. In the figures, the latches that secure the bucket 14 to the upper housing 12 are located in the sidewalls of the bucket 14 and the upper housing 12. However, in another embodiment, the latch can be positioned such that it connects the front edge of the bucket to the front edge of the upper housing. In a preferred embodiment, the latch system used with storage bin 10 is the latch system taught in U.S. Patent Publication No. 2017/0066533 titled Overhead Storage Bin Latch System, the entirety of which is incorporated by reference herein. However, this is not a limitation and other latch systems can be used.

As shown in FIGS. 4A-5B, one of the advantages of the first and second protrusions 30 and 32 is to position luggage 100 closer to the back 22 of the bucket 14 or more outboard (assuming a narrow body aircraft) than if the protrusions were not present (or further away from the front edge than if the protrusions were not present). Positioning luggage outboard (and away from the front edge of the bucket) moves the center of gravity of the luggage outboard and closer to the pivot point, thereby making it easier to close the bin or move the bucket 14 from the closed position to the open position. In other words, a bucket that includes the first and second protrusions requires lower hand loads to close than a bucket without the protrusions. Furthermore, by having two protrusions, different sized luggage can be positioned further outboard, as described below.

Figure 4A:
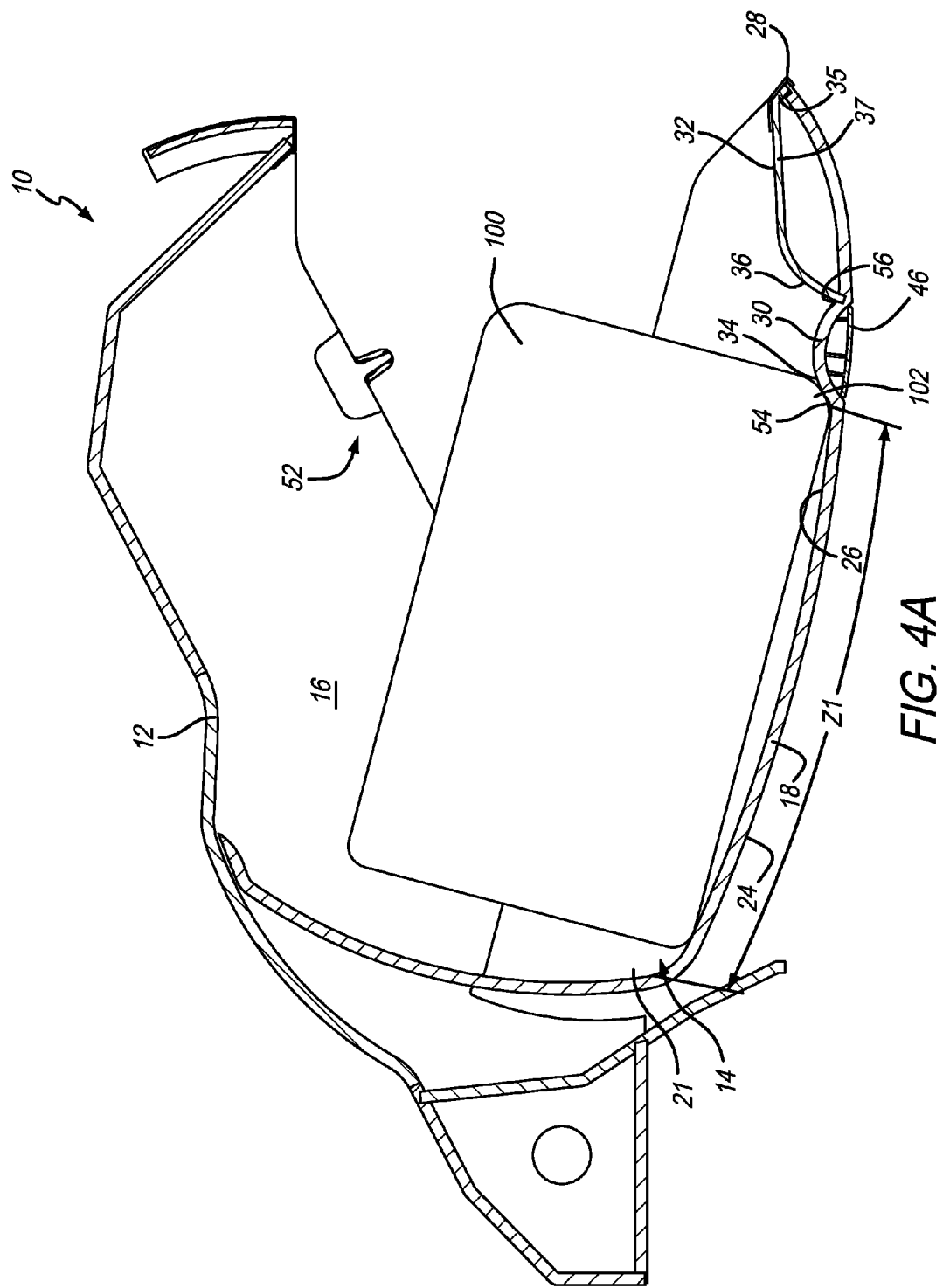
FIG. 4A is a cross-sectional side elevation of an aircraft storage bin in the open position and with a piece of luggage in the first position.
Figure 4B:
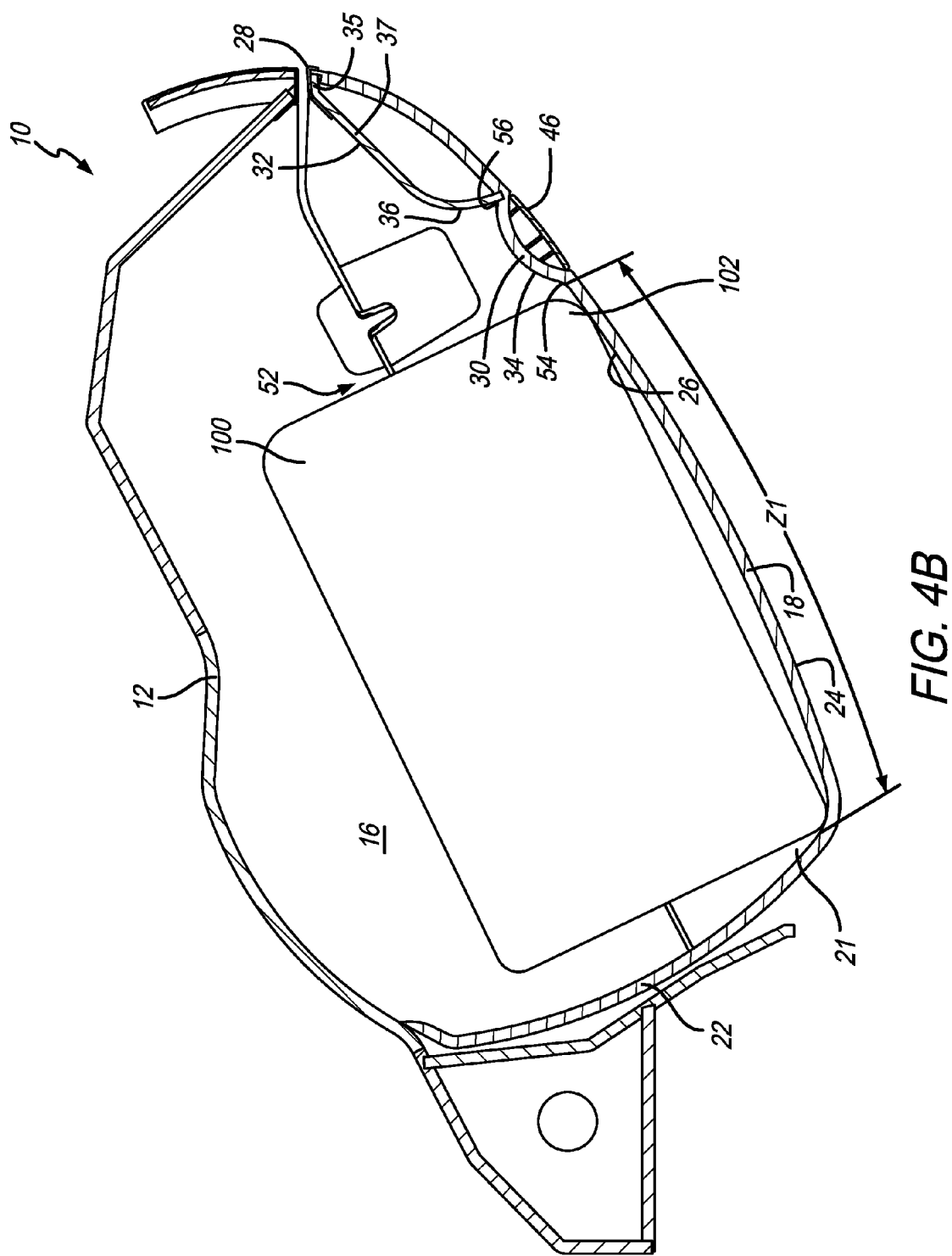
FIG. 4B is a cross-sectional side elevation of an aircraft storage bin in the closed position and with a piece of luggage in the first position.

FIGS. 4A-4B show the bin 10 with a smaller piece of luggage 100 therein. As shown in FIG. 4A, when the luggage 100 is placed in the bucket 14 the bottom inboard corner 102 engages or rests against the first luggage engaging surface 34. It will be appreciated that the first luggage engaging surface 34 cooperates with the inner surface 26 of the bottom 18 to form a first notch 54 that receives the bottom inboard corner 102 of luggage 100. Furthermore, a first luggage zone Z1 is defined between the first notch 54 or the first luggage engaging surface 34 and the back 22. As shown in FIG. 4B, when the bucket 14 is moved to the closed position, the luggage 100 stays within the first luggage zone Z1. When the bucket 14 is moved back to the open position, the first protrusion 30 (and, more particularly, the first luggage engaging surface 34) maintains the luggage 100 in the first luggage zone Z1, as shown in FIG. 4A.

Figure 5A:
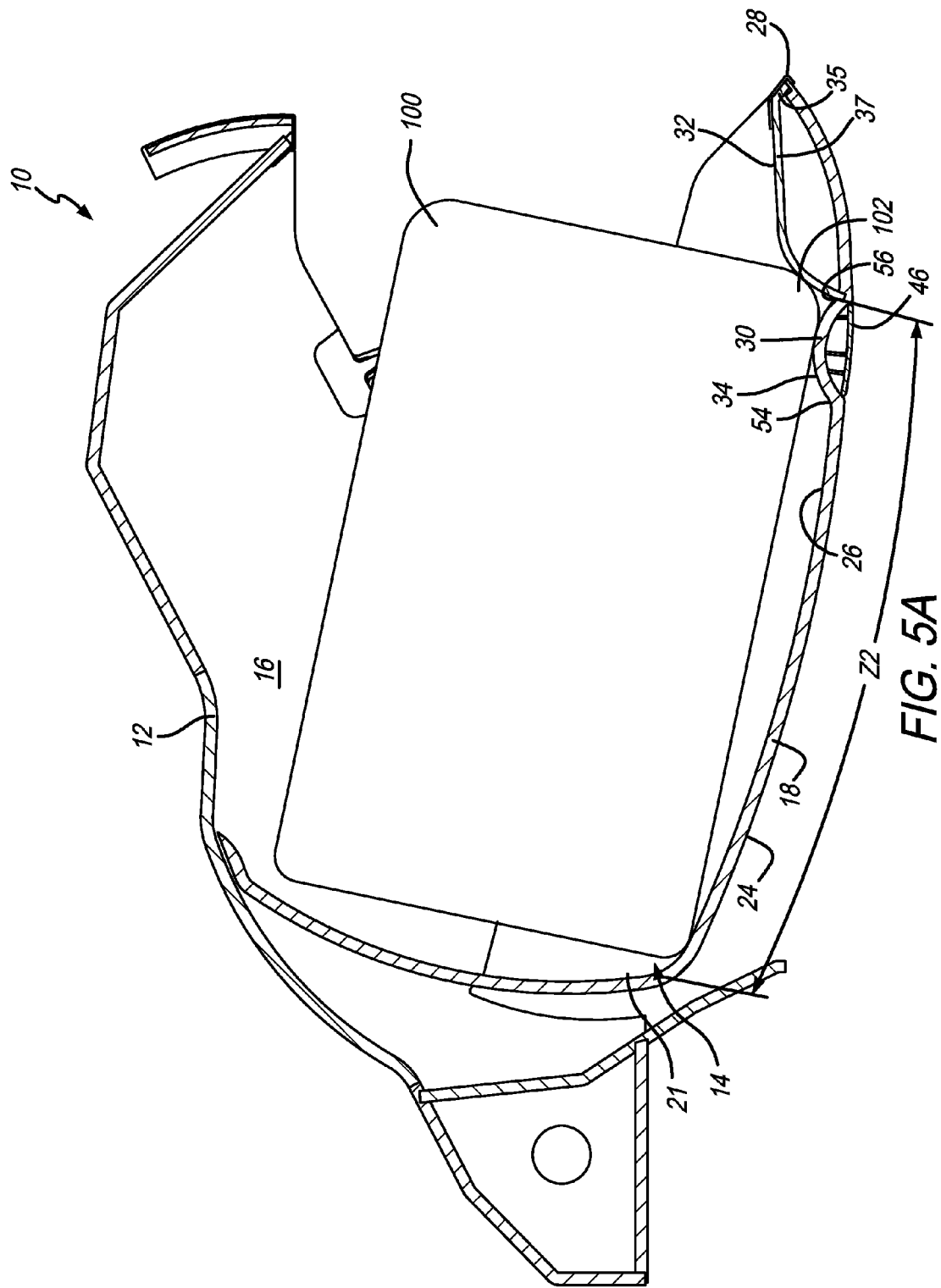
FIG. 5A is a cross-sectional side elevation of an aircraft storage bin in the open position and with a piece of luggage in the second position.
Figure 5B:
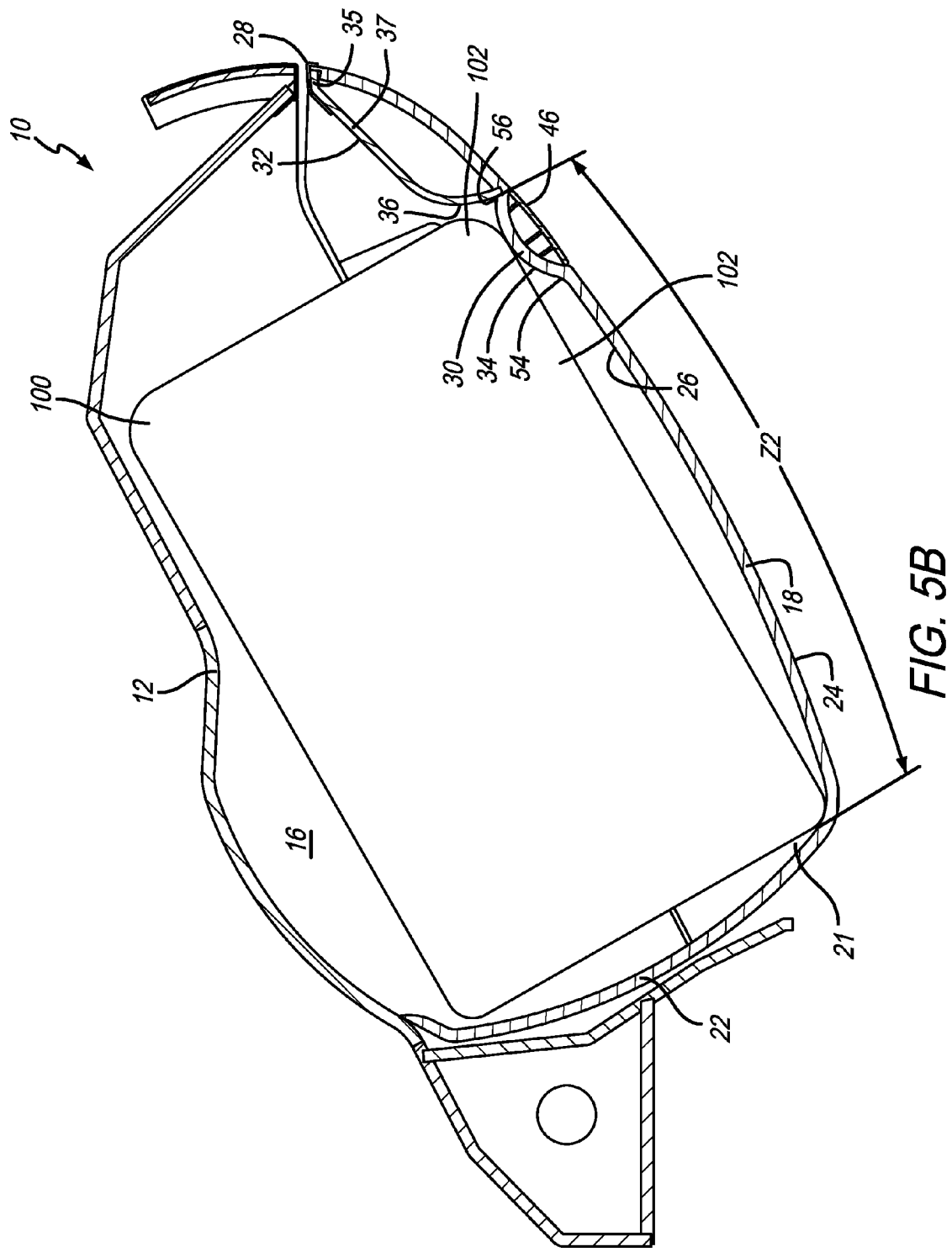
FIG. 5B is a cross-sectional side elevation of an aircraft storage bin in the closed position and with a piece of luggage in the second position.

FIGS. 5A-5B show the bin 10 with a larger piece of luggage 100 therein (i.e., a piece of luggage that is too long to fit in the first luggage zone Z1). As shown in FIG. 5A, when the luggage 100 is placed in the bucket 14 the bottom inboard corner 102 engages or rests against the second luggage engaging surface 36. It will be appreciated that the second luggage engaging surface 36 cooperates with the inner surface of the first protrusion 30 to form a second notch 56 that receives the bottom inboard corner 102 of luggage 100. Furthermore, a second luggage zone Z2 is defined between the second notch 56 or the second luggage engaging surface 36 and the back 22. As shown in FIG. 5B, when the bucket 14 is moved to the closed position, the luggage 100 stays within the second luggage zone Z2. When the bucket 14 is moved back to the open position, the second protrusion 32 (and, more particularly, the second luggage engaging surface 36) maintains the luggage 100 in the second luggage zone Z2, as shown in FIG. 5A.

It will be appreciated by those of ordinary skill in the art that luggage smaller than a first predetermined length or dimension (the distance or length between the first luggage engaging surface 34 and the back 22) fits in or is positioned in the first luggage zone, and luggage that is longer than the first predetermined length fits in or is positioned in the second luggage zone. Luggage that is longer than the distance between the second luggage engaging surface 36 and the back 22 rests on the platform portion 37 (referred to herein as the third luggage zone). Accordingly, the present invention also includes a method of positioning luggage in the bin interior. The method includes positioning a first sized piece of luggage in the first luggage zone and positioning a second sized luggage that is longer than the first sized luggage in the second luggage zone. Put differently, the method includes positioning the first sized luggage between the back and the first luggage engaging surface and positioning the second sized luggage between the back and the second luggage engaging surface (but where the lower inboard corner extends beyond the first luggage engaging surface).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft storage bin comprising,
an upper housing, and
a bucket movable with respect to the upper housing between a closed position and an open position, wherein the upper housing and the bucket cooperate to define a bin interior, wherein the bucket includes a bottom, a back, and first and second opposing side walls, wherein the bottom includes an outer surface, an inner surface, a front edge, and first and second protrusions protruding into the bin interior, wherein the first protrusion defines a first luggage engaging surface and the second protrusion defines a second luggage engaging surface, wherein the first protrusion includes an inner surface and an outer surface, wherein the outer surface of the first protrusion defines a channel, and wherein the channel includes at least a portion of a latch button assembly disposed therein, wherein first and second cables extend outwardly from the latch button assembly and through the channel along the outer surface of the first protrusion, and wherein the bucket includes a cover on the outer surface of the bucket that partially further defines the channel.

2. The aircraft storage bin of claim 1 wherein the first and second protrusions extend between the first and second side walls.

3. The aircraft storage bin of claim 1 wherein at least one of the first and second protrusions is formed in the bottom.

4. The aircraft storage bin of claim 3 wherein the first protrusion is formed in the bottom and wherein the second protrusion is secured to the bottom.

5. The aircraft storage bin of claim 4 wherein the second protrusion includes a platform portion.

6. The aircraft storage bin of claim 1 wherein the cover is removable such that the first and second cables are accessible from an exterior of the bucket.

7. The aircraft storage bin of claim 6 wherein the cover includes a button opening defined therethrough.

8. The aircraft storage bin of claim 1 wherein the first protrusion includes a latch opening defined therethrough.

9. The aircraft storage bin of claim 1 wherein a first luggage zone is defined between the first luggage engaging surface and the back, and wherein a second luggage zone is defined between the second luggage engaging surface and the back.

10. The aircraft storage bin of claim 1 wherein bucket includes first and second side channels defined therein, and wherein the first and second cables extend through the channel and into the first and second side channels, respectively.

11. An aircraft storage bin comprising,
an upper housing, and
a bucket movable with respect to the upper housing between a closed position and an open position, wherein the upper housing and the bucket cooperate to define a bin interior, wherein the bucket includes a bottom, a back and first and second opposing side walls, wherein the bottom includes an outer surface, an inner surface, a front edge, and first and second protrusions extending between the first and second side walls and protruding into the bin interior, wherein the first protrusion defines a first luggage engaging surface and the second protrusion defines a second luggage engaging surface, wherein a first luggage zone is defined between the first luggage engaging surface and the back, and wherein a second luggage zone is defined between the second luggage engaging surface and the back, wherein at least the first protrusion is formed in the bottom, wherein an outer surface of the first protrusion defines a channel that includes at least a portion of a latch button assembly disposed therein, wherein first and second cables extend outwardly from the latch button assembly along the outer surface of the bottom of the bucket, and through the channel, wherein the bucket includes a cover that covers the channel and has a button opening defined therethrough such that a button of the latch button assembly is accessible, and wherein the first protrusion includes a latch opening defined therethrough, such that the latch button assembly is accessible from the bin interior.

12. The aircraft storage bin of claim 11 wherein bucket includes first and second side channels defined therein, and wherein the first and second cables extend through the channel and into the first and second side channels, respectively.

* * * * *